United States Patent
Neely, III et al.

(10) Patent No.: US 7,893,935 B1
(45) Date of Patent: Feb. 22, 2011

(54) METHOD AND SYSTEM FOR HYBRID TRACKBALL AND IMMERSIVE NAVIGATION IN A VIRTUAL ENVIRONMENT

(75) Inventors: Howard Neely, III, Santa Monica, CA (US); Jason Fox, Fairfield, CA (US); Mathias Kolsch, Pacific Grove, CA (US); Matthew Shomphe, Los Angeles, CA (US); Jason Jerald, Chapel Hill, NC (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/592,686

(22) Filed: Nov. 30, 2009

Related U.S. Application Data

(62) Division of application No. 11/075,354, filed on Mar. 7, 2005, now Pat. No. 7,646,394.

(60) Provisional application No. 60/550,808, filed on Mar. 5, 2004.

(51) Int. Cl.
G06T 15/00 (2006.01)
G09G 5/00 (2006.01)

(52) U.S. Cl. .................. 345/419; 345/633

(58) Field of Classification Search ............ 345/419, 345/420, 633
See application file for complete search history.

(56) References Cited

U.S. PATENT DOCUMENTS

| | | |
|---|---|---|
| 3,739,347 A | 6/1973 | Forsberg |
| 4,734,690 A | 3/1988 | Waller |
| 4,847,605 A | 7/1989 | Callahan et al. |
| 4,987,527 A | 1/1991 | Hamada et al. |
| 5,019,809 A | 5/1991 | Chen |
| 5,179,656 A | 1/1993 | Lisle |
| 5,276,785 A | 1/1994 | Mackinlay et al. |
| 5,315,313 A | 5/1994 | Shinagawa |
| 5,319,747 A | 6/1994 | Gerrissen et al. |
| 5,359,703 A | 10/1994 | Robertson et al. |
| 5,689,628 A | 11/1997 | Robertson |
| 5,714,698 A | 2/1998 | Tokioka et al. |
| 5,742,263 A | 4/1998 | Wang et al. |

(Continued)

OTHER PUBLICATIONS

Advanced Visual Systems: http://www.avs.com.

(Continued)

*Primary Examiner*—Ryan R Yang
(74) *Attorney, Agent, or Firm*—Tope-McKay & Assoc.

(57) ABSTRACT

The present invention relates to a system, method, and computer program product for immersive navigation in a virtual environment (VE) suitable for allowing a user to change a view orientation in the VE independently of physical orientation of a user input, such as orientation of the user's head. Specifically, the present invention combines three distinct virtual reality navigation metaphors (trackball navigation, grab navigation, and immersive navigation) into a hybrid navigation approach generating a final virtual-viewpoint that correlates to the characteristics of an intermediate virtual-viewpoint defined by radius, pitch, and heading of a virtual reference sphere (as in trackball navigation), while the final virtual-viewpoint also adjusts the location and gaze direction of the intermediate virtual-viewpoint based on pitch, heading, and roll of the user's head (as in immersive navigation), thus allowing the user to view a point of interest in the VE while simultaneously facing comfortably forward in the physical world.

27 Claims, 7 Drawing Sheets

U.S. PATENT DOCUMENTS

| | | | |
|---|---|---|---|
| 5,808,613 | A | 9/1998 | Marrin et al. |
| 5,936,612 | A | 8/1999 | Wang |
| 6,009,210 | A | 12/1999 | Kang |
| 6,154,723 | A | 11/2000 | Cox et al. |
| 6,160,551 | A | 12/2000 | Naughton et al. |
| 6,241,609 | B1* | 6/2001 | Rutgers ............... 463/31 |
| 6,281,877 | B1 | 8/2001 | Fisher et al. |
| 6,289,299 | B1 | 9/2001 | Daniel, Jr. et al. |
| 6,497,649 | B2 | 12/2002 | Parker et al. |
| 7,667,700 | B1 | 2/2010 | Neely, III et al. |
| 2003/0128208 | A1* | 7/2003 | Shih et al. ............ 345/419 |

OTHER PUBLICATIONS

Feibush, E., N. Gagvani, and D. Williams. 2000. "Visualization for situational awareness". IEEE Computer Graphics and Applications. Sep./Oct. 2000. pp. 38-45.

Poupyrev, I. et al, "The Go-Go Interaction Technique: Non-Linear Mapping for Direct Manipulation in VR", ACM Symposium on User Interface Software and Technology, 1996, pp. 79-80.

Song, D., M. Norman (1993) "Nonlinear Interactive Motion Control Techniques for Virtual Space Navigation", IEEE Virtual Reality Annual International Symposium (VRAIS), Sep. 18-22, Seattle, Washington, 111117. http://citeseer.nj.nec.com/song93nonlinear.html.

Zaiane, O. and A. Ammoura. 2001. "On-line analytical processing while immersed in a CAVE".

Bolter J., Bowman D.A., Hodges L.F., The Virtual Venue: User-Computer Interaction in Information-Rich Virtual Environments.

Bowman, D.A., Interaction Techniques for Common Tasks in Immersive Virtual Environments, Georgia Institute of Technology, Jun. 1999.

Bowman, D. Interaction Techniques for Immersive Virtual Environments: Design, Evaluation, and Application. Human-Computer Interaction Consortium (HCIC) Conference, 1998.

Bowman, D. A. and Hodges, L. F. (1997). An evaluation of techniques for grabbing and manipulating remote objects in immersive virtual environments. In 1997 Symposium on Interactive 3D Graphics, pp. 35-38.

Two Pointer Input for 3D Interaction, 1997, Robert C. Zeleznik, Andrew S. Forsberg, Paul S. Strauss, Symposium on Interactive 3D Graphics.

Lindeman, R., J. Sibert, and J. Hahn. Hand-Held Windows: Towards Effective 2D Interaction in Immersive Virtual Environments. IEEE Virtual Reality, 1999.

Bowman, D., Kruijff, E., LaViola, J., and Poupyrev, I. "An Introduction to 3D User Interface Design." Presence: Teleoperators and Virtual Environments, vol. 10, No. 1, 2001, pp. 96-108.

Hultquist, Jeff, "A Virtual Trackball," In Graphics Gems, Andrew S. Glassner (ed.), Academic Press, Inc., San Diego, California, 1990, pp. 462-463.

Kettner, Lutz. "A classification scheme of 3D interaction techniques." Technical Report B95-05, Freie Universitat Berlin, Apr. 1995.

Kwon, Taewook, T. Kim, Y.-C. Choy. 1999. "A new navigation/traveling method in virtual environment." TENCON 99. IEEE Region 10 Conference, vol. 1, 1999. pp. 348-351.

Time'S Up (http://www.timesup.orq/), Spherical Projection Interface (SPIN).

Wartell, Zachary, William Ribarsky, Larry Hodges. 1999. "Third-Person Navigation of Whole-Planet Terrain in a Head-tracked Stereoscopic Environment". 1999 IEEE Virtual Reality Conference (Mar. 13-17, 1999, Houston TX).

Watsen, K., Darken, R., & Capps, M. (1999). "A handheld computer as an interaction device to a virtual environment." Third Immersive Projection Technology Workshop.

Andersen, G. J., Braunstein, M. L. 1985. Induced self-motion in central vision. Journal of Experimental Psychology: Human Perception and Performance II, 122-132.

Daily, M., Howard, M., Jerald, J., Lee, C., Martin, K., McInnes, D., Tinker, P., Smith, R. 2000. Distributed Design Reviews in Virtual Environments. In Proceedings of CVE 2000, San Francisco, CA, Sep. 2000.

Dichgans, J., Brandt, T. 1978. Visual-Vestibular Interaction: Effects of Self-Motion Perception and Postural Control. In Handbook of Sensory Psychology, vol. VIII: Perception, Springer-Verlag, R. Held, H. W. Leibowitz and H. L. Teuber, Eds., Berlin.

Hettinger, L. J., Riccio, G. E. 1992. Visually Induced Motion Sickness in Virtual Environments. Presence 1, 3, 311-318.

Laviola, J. J. 2000. A Discussion of Cybersickness in Virtual Environments. ACM SIGCHI Bulletin 32, 1, 47-56.

Martin, K. 1999. Creation and Performance Analysis of User Representations in Collaborative Virtual Environments. ACM Computing Surveys Journal. ACM Press.

McCauley, M. E., Sharkey, T. J. 1992. Cybersickness: Perception of Self-Motion in Virtual Environments. Presence 1, 3, 31 1-318.

Parker, D. E., Duh, B. H., Furness, T. A., Prothero, J. D., Seibel, E. J. 2002. Alleviating motion, simulator, and virtual environmental sickness by presenting visual scene components matched to inner ear vestibular sensations. U.S. patent 6,497,649.

Ramey, C. 2000. Boeing Demonstrates Ways to Reduce Joint Strike Fighter Maintenance, Life-Cycle Costs. Boeing Company press release. Jun. 28, 2000. http://www.boeing.com/news/releases/2000/news_release_000628n.htm.

Rensink, R. A., O'Regan, J. K., Clark, J. J. 1997. To See or Not to See: The Need for Attention to Perceive Changes in Scenes. Psychological Science 8, 368-373.

Schunck, G. 1984. The Motion Constraint Equation for Optical Flow. In Proceedings of the International Conference on Pattern Recognition, Montreal, P.O., Canada, 1993, 20-22.

Sharkey, T. J., McCauley, M. E. 1999. The effect of global visual flow on simulator sickness. In Proceedings of the AIAA/AHS Flight Simulation Technologies Conference, American Institute of Aeronautics and Astronautics, Washington, D.C., 496-504.

Sony Computer Entertainment America, Inc. 2003. Playstation. com—Games—EyeToyTM Website (htta;_.( w ww.us.glalyst~tion. 4t~mi mes as ~s_'id,_ SC,~ .97319).

UDLP. 2003. United Defense, L.P. Viewgraph package presented at Boeing Missouri Supplier's Conference, Nov. 17, 2003 (http://www.boeing.com/defense¬space/ic/fcs/bia/03 1202_mo_briefings/031202_ud.pdf), pp. 7.

Delaney, K. J. 2003. Sony Plans to Sell EyeToy in U.S. After Strong Launch. The Wall Street Journal, Aug. 28, 2003.

Pausch, R., Crea, T., Conway, M. 1992. A Literature Survey for Virtual Environments: Military Flight Simulator Visual Systems and Simulator Sickness. Presence 1, 3, 344-363.

Notice of Allowability for U.S. Appl. No. 11/074,496.

Notice of Allowability for U.S. Appl. No. 11/075,354.

\* cited by examiner $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

702

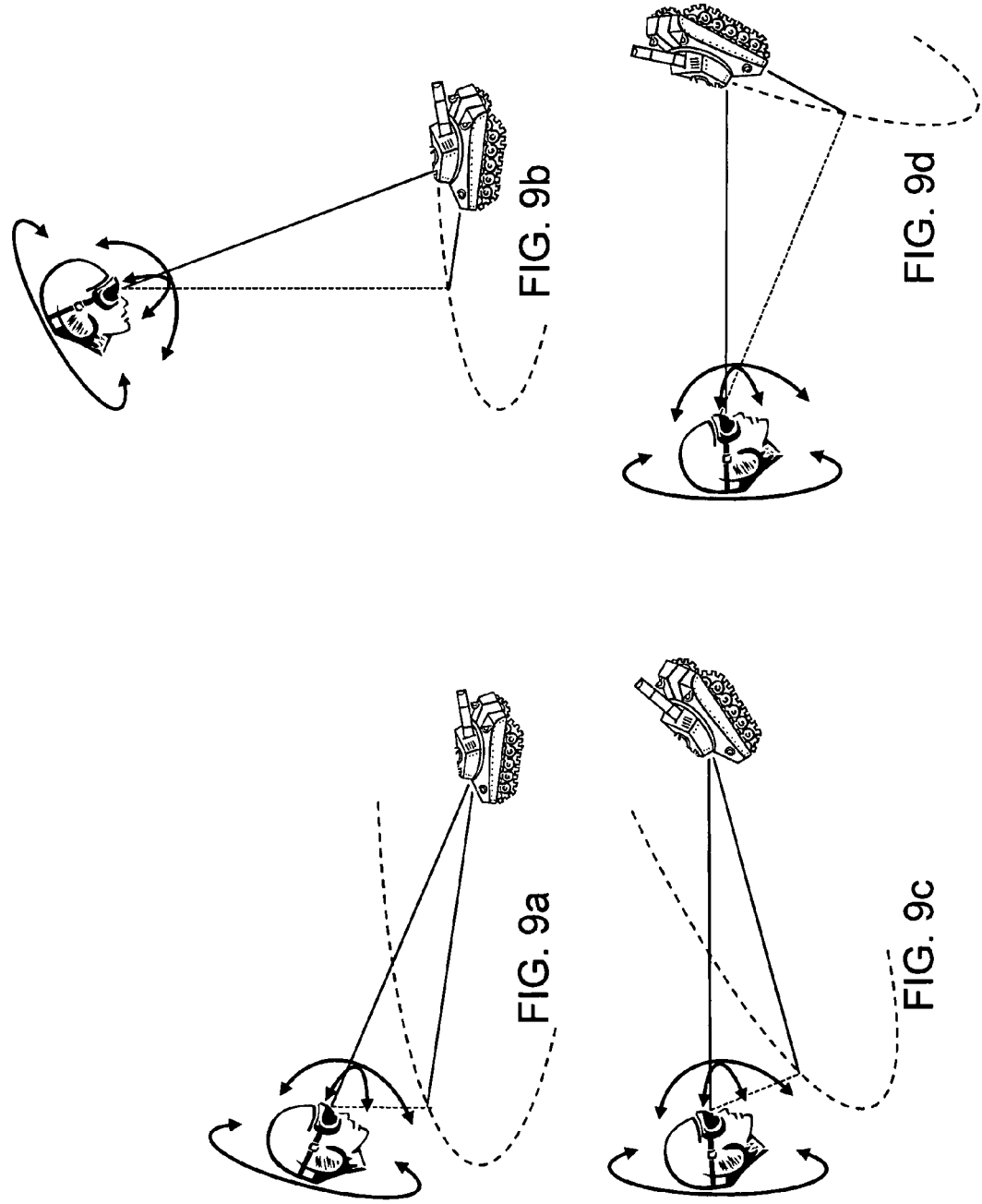

METHOD AND SYSTEM FOR HYBRID TRACKBALL AND IMMERSIVE NAVIGATION IN A VIRTUAL ENVIRONMENT

PRIORITY CLAIM

The present application is a Divisional application of U.S. patent application Ser. No. 11/075,354, filed in the United States on Mar. 7, 2005, entitled "SYSTEM AND METHOD FOR OPERATING IN A VIRTUAL ENVIRONMENT," which claims the benefit of priority of U.S. Provisional Patent Application No. 60/550,808, filed Mar. 5, 2004, and entitled "METHOD AND APPARATUS FOR INTERACTING WITH A VIRTUAL ENVIRONMENT."

BACKGROUND OF THE INVENTION (1) Technical Field

The present invention relates to the fields of virtual reality, computer graphics, and computer vision. Specifically, but without limitation thereto, the present invention pertains to a system, method, and computer program product for immersive navigation in a virtual environment (VE) suitable for allowing a user to change a view orientation in the VE independently of physical orientation of a user input, such as orientation of the user's head. More specifically, the present invention combines three distinct virtual reality navigation metaphors (trackball navigation, grab navigation, and immersive navigation) into a hybrid navigation approach generating a final virtual-viewpoint that allows a user to view a point of interest in the VE at a plurality of orientation views while simultaneously facing comfortably forward in the physical world.

(2) Description of Related Art

Many virtual environment interfaces track a user's physical hand movement to control the placement of the actuator (i.e, user's hand, cursor, or joystick). In fully immersed virtual environments (VE), the head and often some limbs of the user being immersed in the VE are spatially tracked with six degrees of freedom. The six degrees of freedom are the X, Y, and Z coordinates of the position of the tracked body part (for example the head and a hand), and the heading, pitch, and roll of the tracked body part. The known position of the real-viewpoint, i.e., the head, is used to adjust the virtual-viewpoint of the virtual environment in the virtual world, such that turning the head to the left in the real-world environment results in the virtual-viewpoint rotation to the left in the VE. The known position of the hand in the real-world environment is used to render a virtual hand at the respective position in the VE. Thus, extending the hand one meter out from the head in the real-world results in an apparent distance of one meter of the virtual hand from the virtual-viewpoint in the VE. Therefore, in these systems, the user's reach in the VE is constrained to the physical reach of the hand. Some attempts have been made to overcome this limitation. The proposed solutions extend the user's reach in various ways but do not guarantee that the user will actually be able to reach any particular object of interest.

When interaction with a virtual environment from various distances is desired, the physical reaching distance of the hand of the user becomes an unfeasible restriction on the reaching distance in the VE. For example, when the virtual environment is an actual landscape and the user can virtually "fly above" the terrain, then he would not be able to reach to the ground if the user's altitude was higher than about one meter.

Additionally, traditional immersive navigation tracks a user in six degrees of freedom, giving the feeling that the user is immersed in the VE. Immersive navigation is natural as the user physically looks and moves around the room to traverse the VE. However, movement is limited physically by equipment, space, and body posture. Situations that require a user to look up or down for long periods result in fatigue and neck strain.

One method of allowing a user to interact with a VE is called trackball navigation. Trackball navigation allows a user to orbit an object or point of interest to study it from multiple vantage points and distances. Trackball navigation can be described by envisioning a sphere centered on the trackball center. The viewpoint is generally located on the surface of the sphere, and if the user is facing into the neutral direction in the physical world (i.e., straight ahead when seated in a fixed chair), the viewpoint is always directed towards the center of the sphere, i.e., the trackball center.

In trackball navigation, there are two operational viewpoint controls. First, the user can move around on the surface of the sphere. The user can rotate along the surface in a vertical plane (up and down), thus gaining a viewpoint more above or below the trackball center. In addition, the user can move along the surface in a horizontal plane, thus rotating around the trackball center and looking at it from east, northeast, north, etc. When rotating in the horizontal plane, the viewpoint direction may be changed accordingly (west, south west, south, etc.). Second, the user can change the radius of the sphere, which results in apparent zooming in toward and out from the trackball center.

The advantages of trackball navigation are that it closely resembles eye and hand movements of humans during manipulation of objects on a sandbox simulation. By having a multi-directional viewpoint control, the user is able to study a point of interest or object of interest from multiple angles quickly and easily. However, while trackball navigation is constrained, making it easy to control, trackball navigation is not well-suited for navigation in immersive environments. For instance, the head-tracking data, which is one aspect of an immersive environment, alone is not sufficient to determine the trackball parameters needed for trackball navigation, and head-tracking data alone does not naturally map to control the trackball parameters.

Another method of allowing a user to interact with the VE is called grab navigation. Grab navigation increases the perceived range of motion for the user since instead of moving only in the relatively small tracked area of the physical environment, the user is free to travel great distances with a move of the hand. One drawback is that grab navigation alone does not offer any control over the view orientation (virtual-viewpoint).

Using grab navigation allows the user to navigate within the virtual environment by grabbing the virtual world while making a grab-gesture with his hand. As long as the user maintains this gesture, the position in the virtual world where the user grabbed is locked into the position of the hand. Therefore, when physically moving the hand to the right, the user translates to the left in the virtual world. An analogy in a two-dimensional user interface is the "grab document" action in Adobe Reader®. Furthermore, when a user grabs the world and then lowers his hand, the apparent effect is that the world sinks away with the hand, or alternatively, that the user rises above the world.

In situation awareness systems there is a need for a system that allows a user to effectively look straight down on the virtual world while physically looking straight ahead, which is a huge advantage to situation awareness in large-scale virtual environments. In addition, there is a great need for a constrained navigation metaphor that gives super-human capabilities to the user by enabling fast access to strategic vantage points that are not ordinarily available to a user in the physical environment. However, in many virtual environments, these interfaces lead to fatigue in a relatively short time.

Therefore, there is a need for a virtual interface that allows a user to reach for objects far away without exerting himself or herself while also allowing a user to effectively look straight down on the virtual world while physically looking straight ahead comfortably in the physical world. What is needed is a system, method, and computer product which allows for immersive navigation without the draw-backs of fatigue and strain to the user, and also allows for navigation in constrained environments.

For the foregoing reasons, there is a great need in virtual environment interfaces for a system that allows a user to reach for objects far away without exerting the user and to change a view orientation in the VE independently of physical orientation of a user input, such as the orientation of the user's head, in order for the user to view a point of interest in the VE at a plurality of orientation views while simultaneously facing comfortably forward in the physical world.

SUMMARY OF THE INVENTION

The present invention provides a system, a method, and a computer program that overcome the aforementioned limitations and fill the aforementioned needs by combining three distinct virtual reality navigation metaphors (trackball navigation, grab navigation, and immersive navigation) into a hybrid navigation approach that generates a final virtual-viewpoint that enables the user to change a view orientation in the VE independently of physical orientation of a user input and also enables the user to reach for objects far away without exerting the user.

In an aspect of the invention, a system for navigating in a virtual environment and suitable for allowing a user to change a view orientation in the virtual environment independently of physical orientation of a user's input, is presented. In this aspect, the system comprises a processor and a memory coupled with the processor, such that the memory includes means that are executable by the processor for causing the processor to perform a plurality of operations. Initially, the system performs the operation of receiving data from a tracking subsystem having a first sensor set, a second sensor set, and a third sensor set, where all three sensor sets are different from one another. Then, the system locates a point of interest at a center of a reference sphere based on a first set of data inputs from the first sensor set and the system selects the radius length of the reference sphere. Next the system computes a position of an intermediate virtual-viewpoint on the reference sphere, such that the radius of the reference sphere and the location of the intermediate virtual-viewpoint are based on a second set of data inputs from the second sensor set, and the system uses this intermediate virtual-viewpoint to determine a gaze direction from the intermediate virtual-viewpoint to the point of interest.

In this aspect, the system defines a final virtual-viewpoint by adjusting the location and gaze direction of the intermediate virtual-viewpoint based on a third set of data inputs from the third sensor set, such that the final virtual viewpoint allows a user to view the point of interest in the virtual environment from an orientation view correlated to the intermediate virtual viewpoint, while simultaneously allowing the head of the user to face comfortably forward in the physical world. Finally, the system provides the final virtual viewpoint to a rendering engine to generate a virtual display to be displayed on a display device, whereby a user views, through the display device, the point of interest in a virtual environment from the final virtual viewpoint independently of physical orientation of a user input in the physical world.

In another aspect of the present invention, a system computes a reference vector between the final virtual viewpoint and the point of interest, and then receives a fourth set of data inputs from the third sensor set, wherein the fourth set of data inputs corresponds to new position of the head of the user and further correlates to a second point of interest that the user is looking at. In this aspect, the system performs immersive navigation by utilizing the fourth set of data inputs and the reference vector, thus allowing the user to view the second point of interest in the virtual environment relative to the reference vector from the final virtual viewpoint to the point of interest.

In a further aspect of the present invention, the first set of data inputs comprises the initial position of the user with respect to a three-dimensional coordinate system (denoted by the head coordinates: headX, headY, and headZ), and the operation of locating a point of interest comprises computing an initial viewpoint translation matrix. In this aspect, the second set of data inputs are comprised of the radius of the reference sphere, the pitch of the reference sphere, and the heading of the reference sphere, and the operation of computing a position of an intermediate virtual-viewpoint is comprised of computing a trackball matrix to rotate and position the intermediate virtual-viewpoint based on the sphere parameters. In addition, the third set of data inputs are comprised of the pitch of the head of the user, the heading of the head of the user, the roll of the head of the user, and the three-dimensional position of the head of the user within the three-dimensional coordinate system (head-X, head-Y, head-Z), and the operation of defining a final virtual viewpoint is comprised of computing a final hybrid viewpoint matrix.

In still another aspect, the system comprises sensor sets that are selected from a group consisting of a tracker, a keyboard, a computer mouse, a video camera, a gesture recognizer, and speech. Furthermore, the system comprises a display that is selected from a group consisting of a head mounted display, a plurality of video monitors, and a CAVE with supporting three-dimensional rendering software and hardware.

In yet another aspect of the present invention, the system comprises sphere parameters that correlate with the wrist movements of the user, such that the heading of the sphere correlates with the heading of the user's wrist, the pitch of the sphere correlates with the pitch of the user's wrist, and the radius of the sphere correlates with roll of the user's wrist and thumb of the user.

Another aspect of the invention is a system that computes the initial viewpoint translation matrix following the following steps:

$$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where
- $M_1$ denotes the initial viewpoint translation matrix,
- headX, headY, and headZ denote the initial position of the head of the user with respect to a three-dimensional coordinate system, and
- sphereX, sphereY, and sphereZ denote sphere parameters in units of the virtual environment centered on the point of interest.

In this aspect, the trackball matrix is computed by the system using pre-multiplication of 4×4 matrices as follows:

$$R_1 = \begin{bmatrix} \text{Cos(sphere}-heading) & -\text{Sin(sphere}-heading) & 0 & 0 \\ \text{Sin(sphere}-heading) & \text{Cos(sphere}-heading) & 0 & 0 \\ 0 & 0 & 1 & 0 \\ 0 & 0 & 0 & 1 \end{bmatrix}$$

$$M_2 = R_1 M_1$$

$$R_2 = \begin{bmatrix} 1 & 0 & 0 & 0 \\ 0 & \text{Cos(sphere}-pitch) & -\text{Sin(sphere}-pitch) & 0 \\ 0 & \text{Sin(sphere}-pitch) & \text{Cos(sphere}-pitch) & 0 \\ 0 & 0 & 0 & 1 \end{bmatrix}$$

$$M_3 = R_2 M_2$$

$$T = \begin{bmatrix} 1 & 0 & 0 & 0 \\ 0 & 1 & 0 & \text{sphere}-\text{radius} \\ 0 & 0 & 1 & 0 \\ 0 & 0 & 0 & 1 \end{bmatrix}$$

$$M_4 = T M_3$$

where
- $M_4$ denotes the trackball matrix,
- $R_1$ denotes a 4×4 rotational matrix that rotates matrix $M_1$ by sphere-heading about (0, 0, 1)
- $R_2$ denotes a 4×4 rotational matrix that rotates matrix $M_2$ by sphere-pitch about (1, 0, 0), and
- T denotes a 4×4 translational matrix that translates matrix $M_3$ by (0, sphere-radius, 0).

Furthermore, the system in this aspect computes the final hybrid viewpoint matrix by constructing a rotation matrix based on head orientation parameters as follows:

$$M_5 = RPH$$

$$R = \begin{bmatrix} \text{Cos(head}-roll) & 0 & \text{Sin(head}-roll) & 0 \\ 0 & 1 & 0 & 0 \\ -\text{Sin(head}-roll) & 0 & \text{Cos(head}-roll) & 0 \\ 0 & 0 & 0 & 1 \end{bmatrix}$$

$$P = \begin{bmatrix} 1 & 0 & 0 & 0 \\ 0 & \text{Cos(head}-pitch) & -\text{Sin(head}-pitch) & 0 \\ 0 & \text{Sin(head}-pitch) & \text{Cos(head}-pitch) & 0 \\ 0 & 0 & 0 & 1 \end{bmatrix}$$

-continued $$H = \begin{bmatrix} \text{Cos(head}-heading) & -\text{Sin(head}-heading) & 0 & 0 \\ \text{Sin(head}-heading) & \text{Cos(head}-heading) & 0 & 0 \\ 0 & 0 & 1 & 0 \\ 0 & 0 & 0 & 1 \end{bmatrix}$$

where
- $M_5$ denotes the rotation matrix based on head orientation parameters,
- R denotes a 4×4 matrix transform for roll of the head of the user,
- P denotes a 4×4 matrix transform for pitch of the head of the user,
- and H denotes a 4×4 matrix transform for heading of the head of the user.

In this aspect, the final hybrid viewpoint matrix, $M_6$, is constructed by the system by rotating and positioning the initial view point translation matrix by head orientation parameters and then restoring the computed trackball matrix position parameters into the hybrid viewpoint matrix, $M_6$, as follows:

$$M_6 = M_1 M_5$$

$$M_{6(3,0)} = M_{4(3,0)}$$

$$M_{6(3,1)} = M_{4(3,1)}$$

$$M_{6(3,2)} = M_{4(3,2)}$$

where
- $M_{4(3,0)}$ denotes the (3,0) coefficient of the trackball matrix $M_4$
- $M_{4(3,1)}$ denotes the (3,1) coefficient of the trackball matrix $M_4$, and
- $M_{4(3,2)}$ denotes the (3,2) coefficient of the trackball matrix $M_4$.

Another aspect of the present invention comprises a computer implemented method for navigating in a virtual environment, such that the computer implemented method is suitable for allowing a user to change a view orientation in the virtual environment independently of physical orientation of a user input. In this aspect, the method comprises an act of causing a processor to perform operations of: receiving data from a tracking subsystem having three distinct sensor sets; locating a point of interest at a center of a reference sphere based on a first set of data inputs from the first sensor set; selecting the radius of the sphere; and computing a position of an intermediate virtual-viewpoint on the reference sphere, such that the radius of the reference sphere and the location of the intermediate virtual-viewpoint are based on a second set of data inputs from the second sensor set.

In this aspect, the method further performs the operation of determining a gaze direction from the intermediate virtual-viewpoint to the point of interest and the operation of defining a final virtual-viewpoint by adjusting the location and gaze direction of the intermediate virtual-viewpoint based on a third set of data inputs from the third sensor set, such that the final virtual viewpoint allows a user to view the point of interest in the virtual environment from an orientation view correlated to the intermediate virtual viewpoint, while simultaneously allowing the head of the user to face comfortably forward in the physical world. Finally, the method in this aspect provides the final virtual viewpoint to a rendering engine to generate a virtual display to be displayed on a display device, whereby a user views, through the display device, the point of interest in a virtual environment from the final virtual viewpoint independently of physical orientation of a user input in the physical world.

In another aspect of the present invention, a computer implemented method performs the operations of computing a reference vector between the final virtual viewpoint and the point of interest and then receiving a fourth set of data inputs from the third sensor set, such that the fourth set of data inputs corresponds to new position of the head of the user and further correlates to a second point of interest that the user is looking at. In this aspect, the method performs immersive navigation by utilizing the fourth set of data inputs and the reference vector, thus allowing the user to view the second point of interest in the virtual environment relative to the reference vector from the final virtual viewpoint to the point of interest.

The features of the above aspects of the present invention may be combined in many ways to produce a great variety of specific embodiments and aspects of the invention, as will be appreciated by those skilled in the art. Furthermore, the operations in the method, apparatus/system, and computer program product method embodiment are analogous to each other.

BRIEF DESCRIPTION OF THE DRAWINGS

The objects, features and advantages of the present invention will become better understood from the following detailed descriptions of the preferred embodiment of the invention in conjunction with reference to the following appended claims, and accompanying drawings where:

FIGS. 9a-9d depict the virtual and real-world results of the final hybrid viewpoint matrix in accordance with one aspect of the present invention.

DETAILED DESCRIPTION

Figure 1:
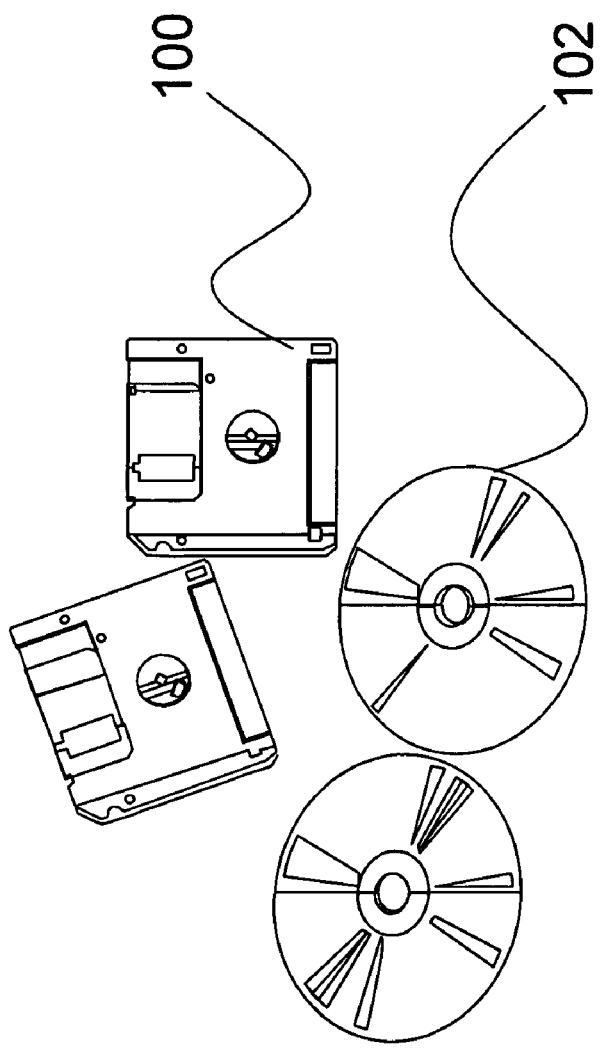
FIG. 1 is an illustrative diagram of a computer program product aspect of the present invention.

The present invention relates to navigating and interacting with a virtual environment. Specifically, but without limitation thereto, the present invention pertains to a system, method and computer program product for immersive navigation in a virtual environment (VE) suitable for allowing a user to change a view orientation in the VE independently of physical orientation of a user input, such as orientation of the user's head. More specifically, the present invention combines three distinct virtual reality navigation metaphors (trackball navigation, grab navigation, and immersive navigation) into a hybrid navigation approach generating a final virtual-viewpoint that allows a user to view a point of interest in the VE at a plurality of orientation views while simultaneously facing comfortably forward in the physical world.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, a detailed description of the elements is provided in order to enable the reader to make and use the various embodiments of the invention without involving extensive experimentation.

(3) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in teaching a general understanding of the present invention.

CAVE—An acronym for "Automatic-Virtual-Environment, Audio-Visual-Experience." The term "CAVE," as used herein, is a standard term used in the field of virtual reality to denote a virtual reality interface that consists of a room whose walls, ceiling, and floor surround a viewer, or user, with projected images.

Computer readable media—The term "computer readable media," as used herein, denotes any media storage device that can interface with a computer and transfer data back and forth between the computer and the computer readable media. Some non-limiting examples of computer readable media include: an external computer connected to the system, an internet connection, a Compact Disk (CD), a Digital Versatile Disk/Digital Video Disk (DVD), a floppy disk, a magnetic tape, an internet web camera, a direct satellite link, a video cassette recorder (VCR), a removable hard drive, a digital camera, a video camera, a video cassette, an electronic email, a printer, a scanner, a fax, a solid-state recording media, a modem, a read only memory (ROM), and flash-type memories.

Grab navigation—The term "grab navigation," as used herein, is a standard term used, in the field of virtual reality, to denote navigation in a virtual environment such that a user or participant is allowed to increase the user's perceived range of motion. Instead of moving only in the relatively small tracked area of the physical environment, the user is free to travel great distances with a move of the user's hand. However, Grab Navigation alone does not offer any control over the view orientation in the virtual environment.

Immersive navigation—The term "immersive navigation," as used herein, is a standard term used, in the field of virtual reality, to denote navigation in a virtual environment such that a user or participant feels that the participant is immersed in the virtual environment. Immersive navigation is accomplished by tracking a participant in six degrees of freedom thus simulating the feeling that the participant is immersed in the virtual environment. Immersive navigation is natural as the user physically looks and moves around the room to traverse the virtual environment. However, movement is limited physically by equipment, space, and body posture, and in situations that require a user to look up or down for long periods, result in fatigue and neck strain.

Input—The term "input," as used herein, is used to denote any device used to receive input from a user or a system. Some non-limiting examples of input devices are: a sensor set, a tracker, a keyboard, a microphone, a computer mouse, a video camera, a gesture recognizer, speech, a wireless signal communication, a game engine, and an electronic writing device, wherein the electronic writing device permits a user to write notes and to draw doodles on a pad to be transferred to a computer by use of a special electronic ball point pen.

Instruction means—The term "instruction means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

Real-time—The term "real-time," as used herein, is a standard term used to relate to computer systems that update information, or perform a task, at the same rate as they receive data.

Trackball navigation—The term "trackball navigation," as used herein, is a standard term used in the field of virtual reality to denote navigation in a virtual environment such that a user or participant is allowed to orbit an object or point of interest to study it from multiple vantage points and distances. Trackball navigation is constrained, making it easy to control but not well suited to immersive environments. In addition, head-tracking data alone does not naturally map to control of trackball parameters.

User—The term "user," as used herein, denotes a person or a participant utilizing the system or the method for navigating in a virtual environment that is suitable for allowing the user or participant to navigate in an immersive manner within the virtual environment while changing a view orientation in the virtual environment independently of the physical orientation of a user input, such as the orientation of the head of the user.

(4) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all these, and similar terms, are to be associated with the appropriate physical quantities and are merely convenient labels applied to these quantities. Unless specifically stated otherwise, as apparent from the following discussions, it is appreciated that throughout the present disclosure, discussions utilizing terms such as "acquiring," "amplifying," "augmenting," "calculating," "communicating," "computing," "controlling," "converting," "defining," "determining," "displaying" "downloading," "extracting," "inputting," "interacting," "interfacing," "locating,' "matching," "modeling," "obtaining," "outputting," "performing," "processing," "providing," "receiving," "recognizing," "recovering," "selecting,' "separating," "tracking," "transforming," "transmitting," "translating," or "uploading," refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

In addition, please note, the labels left, right, front, back, top, bottom, forward, reverse, north, west, south, east, north west, south west, north east, south east, clockwise and counter clockwise have been used for convenience purposes only and are not intended to imply any particular fixed direction. Instead, they are used to reflect relative locations and/or directions between various portions of an object of interest. As such, as the present invention is turned around and/or over, the above labels may change their relative configurations."

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(5) Physical Embodiments of the Present Invention

The present invention has three principal "physical" embodiments. The first is a system for navigating in a virtual environment and suitable for allowing a user to change a view orientation in the virtual environment independently of physical orientation of a user input, wherein the system is typically but not limited to a computer system operating software in the form of a "hard coded" instruction set. In addition, the system maybe comprised of a processor and a memory coupled with the processor, wherein the memory includes means that are executable by the processor for causing the processor to perform a plurality of operations.

This system may also be specially constructed, as an application-specific integrated circuit (ASIC), or as a readily reconfigurable device such as a field-programmable gate array (FPGA). The second physical embodiment is a computer implemented method, typically in the form of software, operated using a data processing system (computer). The method comprising an act of causing a data processing system to perform a plurality of operations.

Furthermore, the operations performed by the present invention may be encoded as a computer program product or a computer program embodied in a computer-readable medium. Thus, the third principal physical embodiment of the present invention is a computer program product comprising computer-readable means stored on a computer readable medium that are executable by a computer having a processor for causing the processor to perform a plurality of the operations. The computer program generally represents computer-readable code stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. An illustrative diagram of a computer program embodied in a computer-readable medium and embodying the present invention is depicted in FIG. 1. The computer program embodied in a computer readable medium is depicted as a magnetic disk 100 or an optical disk 102 such as a CD or DVD. However, as mentioned previously, the computer program generally represents computer-readable code stored on any desirable computer readable medium.

(6) System Overview

The description outlined below sets forth a system and method which may be used for immersive navigation in a virtual environment. The disclosed system and method enables a user to change a view orientation in a VE, independent of the physical orientation of the user input.

Figure 2:
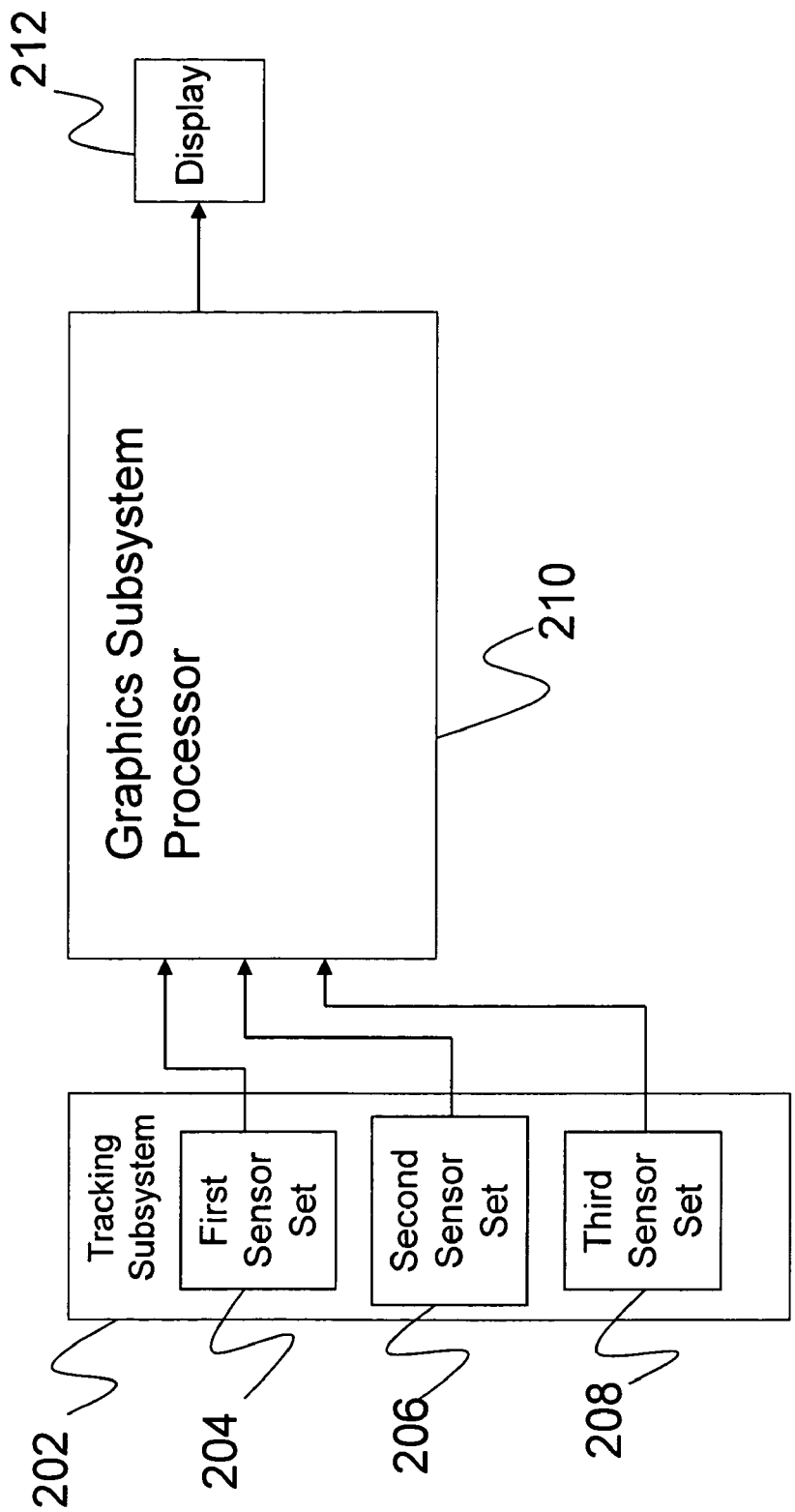
FIG. 2 is block diagram of one aspect of the present invention.

A block diagram depicting the components of a computer system that may be used in conjunction with the present invention is provided in FIG. 2. The computer system comprises a tracking subsystem 202, a graphics subsystem processor 210, and a display 212.

The tracking subsystem 202 comprises a first sensor set 204, a second sensor set 206, and an optional third sensor set 208. Non-limiting examples of sensor sets 204, 206, and 208 include any combination of sophisticated trackers, a keyboard, a mouse, a video camera, a gesture recognizer, or speech. In one aspect of the invention, the second sensor set 206 and the third sensor set 208 includes sensors placed on a user's hand, while the first sensor set 204 includes sensors placed on a user's head. In another aspect of the invention, the participant or user is immersed in the VE, thus the first sensor set 204 can be either a head-mounted display, or a plurality of video monitors, or a Cave Automatic Virtual Environment (CAVE) with supporting 3D rendering software and hardware.

Data from the first sensor set 204 allows a user to locate a point of interest at a center of a reference sphere. Data from the second sensor set 206 allows the user to select a radius of the reference sphere. This reference sphere is used in what is commonly referred to as trackball navigation. The data from the second sensor set 206 allows for the computation of a location of an intermediate virtual-viewpoint on the reference sphere. Essentially, the data from the second sensor set 206 allows for the determination of the heading, pitch, and radius for trackball navigation. In one aspect, gesture recognition is used in combination with the second sensor set 206 to determine the heading, pitch, and radius for trackball navigation. A gaze direction, from the first sensor set 204, is determined along a ray starting at the intermediate virtual-viewpoint and ending at the point of interest.

Data from the optional third sensor set 208 allows the user to define the final virtual-viewpoint by adjusting the location and gaze direction of the intermediate virtual viewpoint. The optional third sensor set 208 maybe a separate set of sensors from the second sensor set 206. In one aspect, the second sensor set 206 is positioned on a user's wrists while the optional third sensor set 208 is positioned on a user's fingers. One skilled in the art will appreciate that the two different sensor sets, the second sensor set 206 and the optional third sensor set 208, are not limited to the user's hands.

One skilled in the art will appreciate that the first sensor set 204, the second sensor set 206, and the optional third sensor set 208 constantly feed inputs into the graphics subsystem processor 210 by which the final virtual-viewpoint is adjusted. For example, additional data from the first sensor set 204 can reposition the center of the reference sphere.

The final virtual-viewpoint is sent from the Graphics Subsystem Processor 210 to the display 212 for display to the user.

As previously described above, trackball navigation and grabbing are commonly used in navigating virtual environments, however, to combine these two techniques and enable them to be used in an immersive environment, new semantics are needed. Thus, a grab-move translation in the horizontal plane operates on the trackball center, which was described above. In one embodiment, the trackball center stays fixed on the ground at all times. A grab-move translation, indicated by input from the second sensor set 206, in the vertical plane will modify the trackball parameters (i.e., radius and location on the surface) to achieve an apparent viewpoint translation in the virtual plane. For example, the participant grabs the world, and then moves his hand down and releases the grab gesture. The corresponding action in the VE is that the world is lowered with respect to the viewpoint. The trackball center stays at the same position since no horizontal grab-move translation was involved. The viewpoint also stays at the same horizontal position. To accommodate for the elevated viewpoint, the radius of the trackball and the angle between the ground and a ray from the trackball center to the viewpoint are increased.

Figure 3:
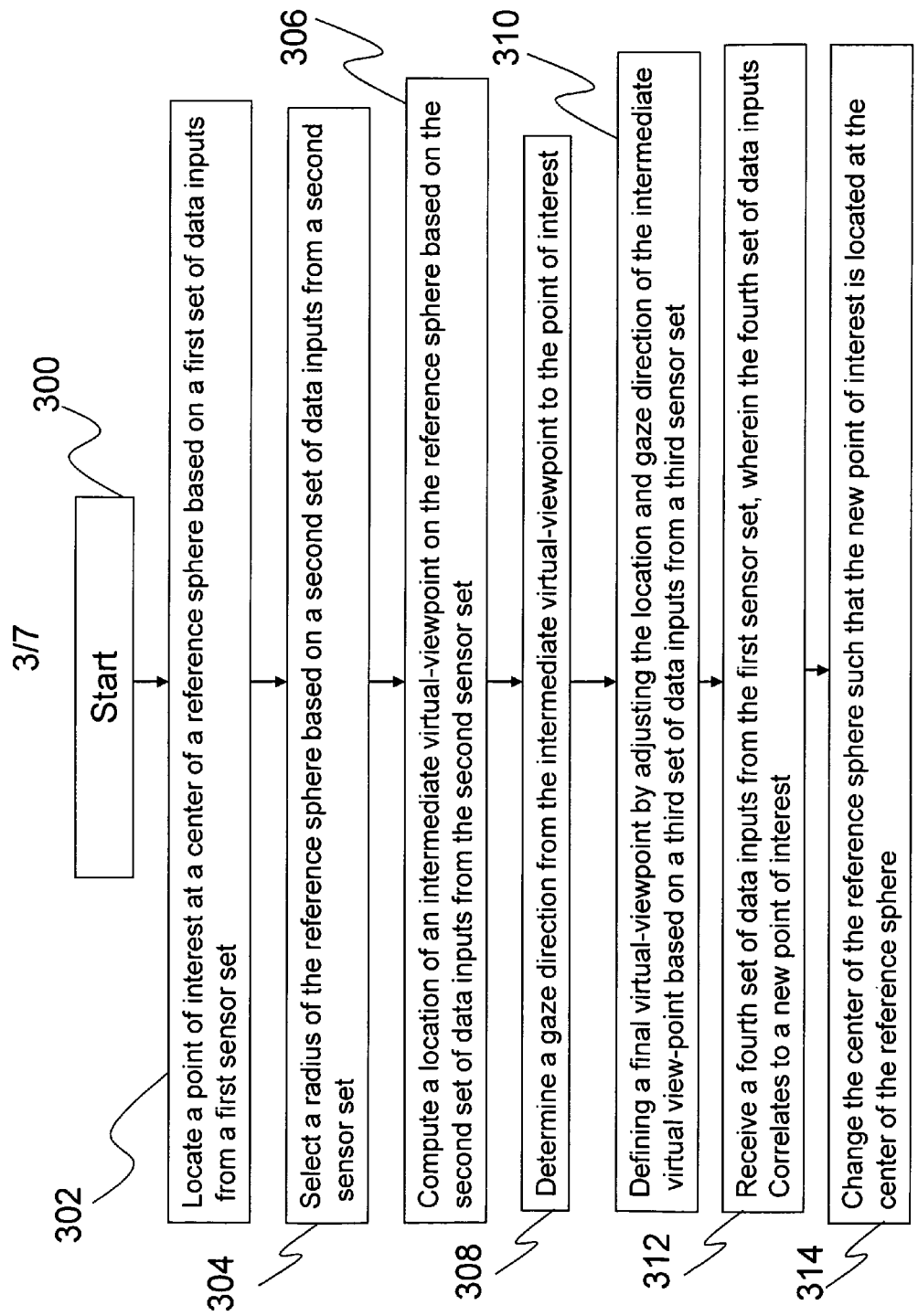
FIG. 3 is a block diagram of a virtual navigation aspect in accordance with the present invention.

The graphics subsystem 210 performs a variety of acts in order to change the virtual viewpoint in response to the participant's movements in the real world. As shown in FIG. 3, after the start 300 of the technique, an operation of locating 302 a point of interest at a center of a reference sphere based on a first set of data inputs from the second sensor set 206 (shown in FIG. 2) is performed. Next, an operation of selecting 304 a radius of the reference sphere based on a second set of data inputs from the second sensor set 206 (shown in FIG. 2) is performed. Subsequently, an operation of computing 306 an intermediate virtual-viewpoint on the reference sphere based on the second set of inputs is performed. Next, an operation of determining 308 a gaze direction from the intermediate virtual-viewpoint to the point of interest is performed. Subsequently, an optional operation of defining 310 a final virtual-viewpoint by adjusting the location and gaze direction of the intermediate virtual-viewpoint based on a third set of data inputs from the optional third sensor set 208 (shown in FIG. 2) is performed. Next, an operation of receiving 312 a fourth set of data inputs from the first sensor set 404 is performed, wherein the fourth set of data inputs correlates to a new point of interest. Finally, an operation of changing the center of the reference sphere is performed such that the new point of interest is located at the center of the reference sphere.

(7) Detailed Description of the Elements

One skilled in the art will appreciate that the following description is provides just one of many different ways that the above described system and method may be implemented in pseudo-code.

Figure 4:
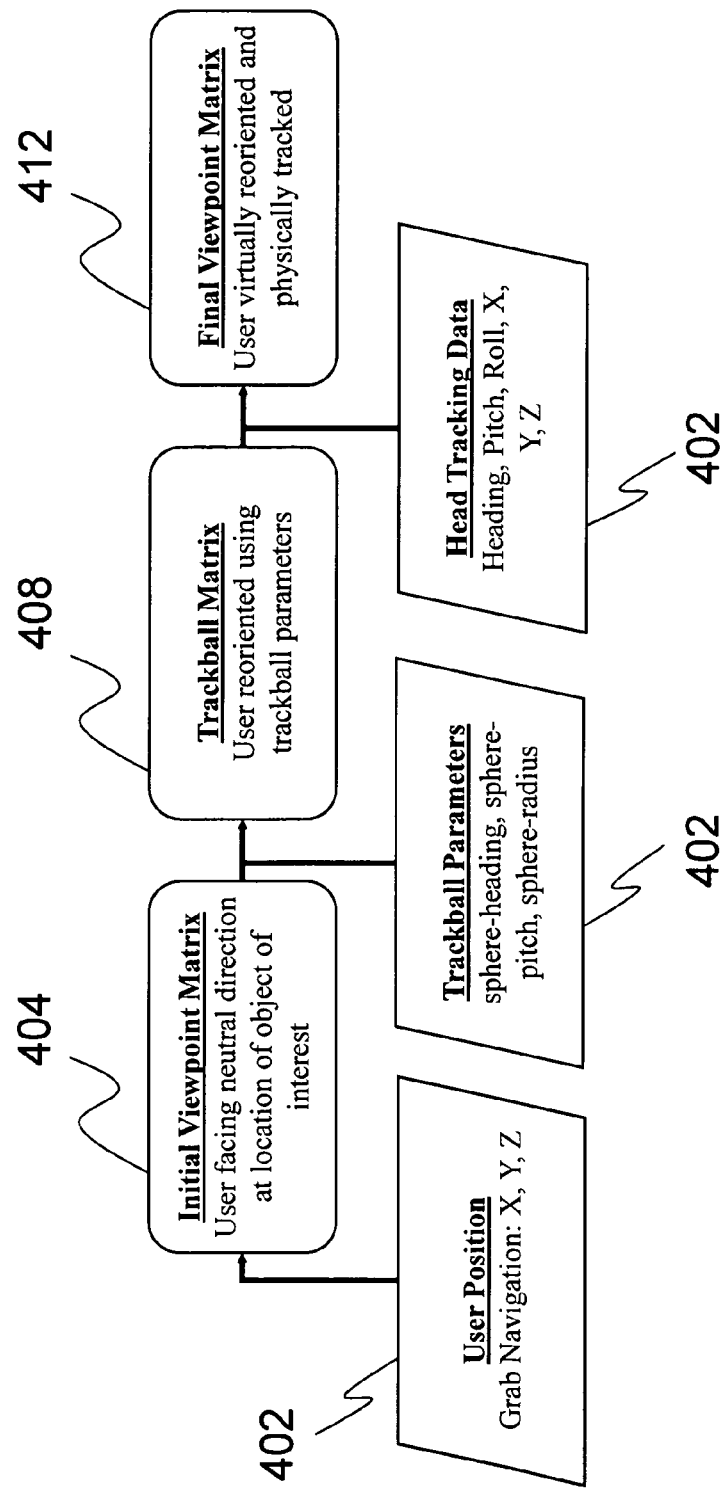
FIG. 4 is a flow diagram of how the various inputs are used to form various matrices in one aspect of the present invention.

FIG. 4 depicts one embodiment of how the various inputs from the sensor sets 204, 206, and 208 (shown in FIG. 2) can be incorporated to change the virtual viewpoint. In one embodiment, the act of locating 302 (shown in FIG. 3) comprises an act of determining the user's position in the virtual world through the grab navigation parameters X, Y, and Z 402. These parameters are used to form the initial viewpoint matrix 404.

Figure 5:
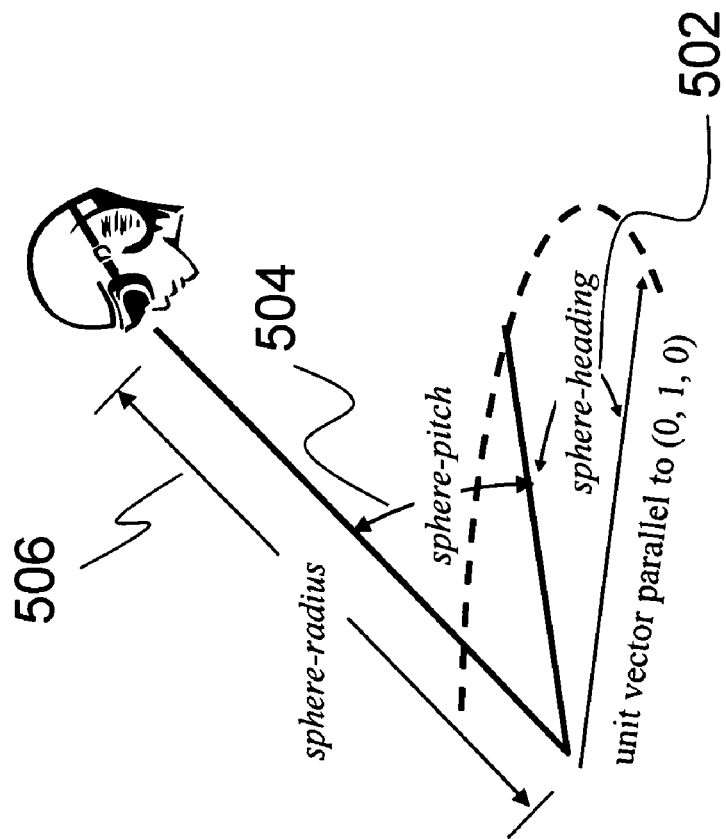
FIG. 5 depicts graphically the trackball (sphere) orientation and radius in accordance with one aspect of the present invention.

The operation of selecting a radius 304 (shown in FIG. 3) comprises an act of receiving the trackball parameters 406 from the second set of sensors 206 (shown in FIG. 2). The trackball center position is defined as a vector comprising sphereX, sphereY, and sphereZ, each of the vector components being distances. FIG. 5 depicts, graphically, the trackball (sphere) orientation and radius. Trackball (sphere) orientation and radius are defined as a vector comprising sphere-heading 502 which is an angle, sphere pitch 504, which is also an angle, and sphere-radius 506, which is a distance.

Figure 6:
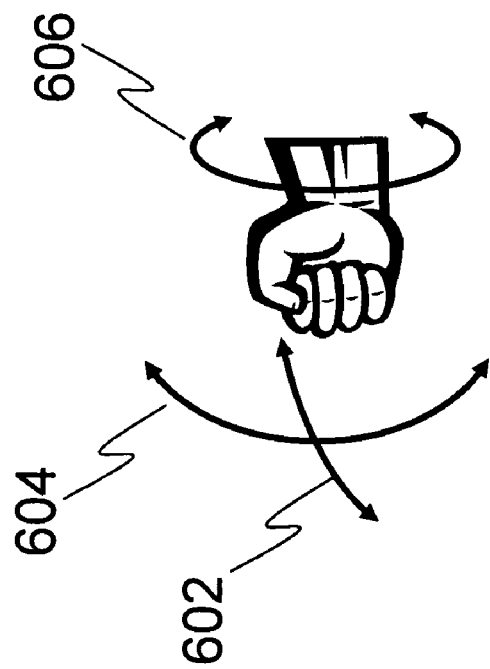
FIG. 6 depicts various user's wrist movements in accordance with one aspect of the present invention.

In one aspect of the present invention, dynamic hand gestures are used to obtain input values for the trackball parameters. One skilled in the art will appreciate that these hand gestures are just an example of many different types of hand (or other body parts) gestures that can be used to implement the disclosed system and method. As shown in FIG. 6, the participant can adjust various parameters though the movement of his wrist. For example, the movement of the wrist can involve a left to right motion 602, and up-down motion 604, or a roll motion 606. These various motions 602, 604, and 606 can be used to change the trackball parameters.

In one aspect of the invention, the participant may invoke a change in sphere-heading 502 by making a fist and pivoting the wrist at the elbow left and right 602. Likewise, the participant may change sphere pitch 504 by making a fist and pivoting his wrist at the elbow up and down 604. To change sphere-radius 506, the participant can make a fist and roll 606 his wrist toward or away from his body. One skilled in the art will appreciate that the values obtained by tracking the wrist may affect the trackball parameters directly, or control the speed or acceleration of the trackball parameters.

Once the various input variables are defined and provided, the act of locating 302 (shown in FIG. 3) further comprises an operation of constructing a translation matrix 702 (shown in FIG. 7) to position the viewpoint at the center of the trackball, offset by the participant's physical location, relative to a physical origin in the tracking space.

Subsequently, the act of computing a location 306 (shown in FIG. 3) is performed. In one embodiment the operation of computing a location 306 comprises changing the position of the viewpoint, i.e., forming the trackball matrix 408 (shown in FIG. 4) based on sphere (trackball) parameters 406 using pre-multiplication of 4×4 matrices. For example:

Matrix $M_2=R_1M_1$, where $R_1$ denotes a 4×4 rotational matrix that rotates matrix $M_1$ by sphere-heading about (0, 0, 1). An example of the rotational matrix $R_1$ is given as follows:

$$R_1 = \begin{bmatrix} \text{Cos(sphere}-\text{heading)} & -\text{Sin(sphere}-\text{heading)} & 0 & 0 \\ \text{Sin(sphere}-\text{heading)} & \text{Cos(sphere}-\text{heading)} & 0 & 0 \\ 0 & 0 & 1 & 0 \\ 0 & 0 & 0 & 1 \end{bmatrix}$$

Matrix $M_3=R_2M_2$, where $R_2$ denotes a 4×4 rotational matrix that rotates matrix $M_2$ by sphere pitch about (1, 0, 0). An example of the rotational matrix $R_2$ is given as follows:

$$R_2 = \begin{bmatrix} 1 & 0 & 0 & 0 \\ 0 & \text{Cos(sphere}-\text{pitch)} & -\text{Sin(sphere}-\text{pitch)} & 0 \\ 0 & \text{Sin(sphere}-\text{pitch)} & \text{Cos(sphere}-\text{pitch)} & 0 \\ 0 & 0 & 0 & 1 \end{bmatrix}$$

Matrix $M_4=TM_3$ where T denotes a 4×4 translational matrix that translates matrix $M_3$ by (0, sphere-radius, 0). An example of the translational matrix T is given as follows:

$$T = \begin{bmatrix} 1 & 0 & 0 & 0 \\ 0 & 1 & 0 & \text{sphere}-\text{radius} \\ 0 & 0 & 1 & 0 \\ 0 & 0 & 0 & 1 \end{bmatrix}$$

Figures 7, 8:
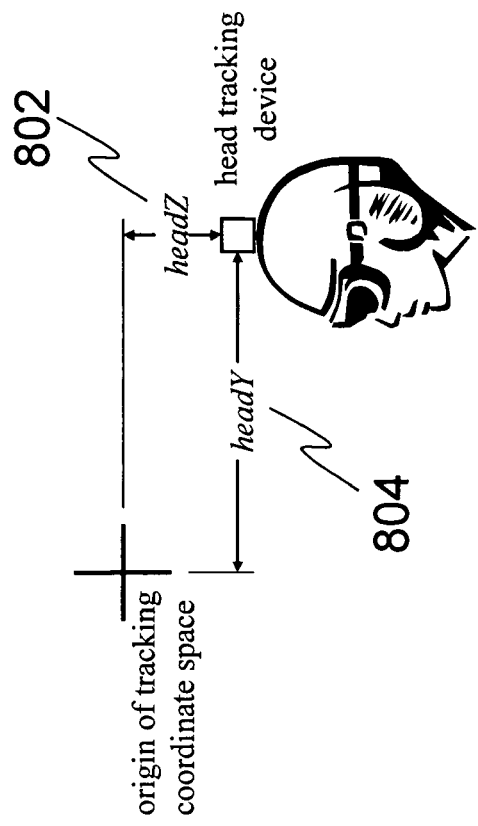
FIG. 7 depicts a translation matrix in accordance with one aspect of the present invention.
FIG. 8 depicts a right hand coordinate system for a head tracking system in accordance with one aspect of the present invention.

Next, an act of determining a gaze direction 308 (shown in FIG. 3) is performed. The act of determining a gaze direction 308 comprises inputting head tracking data 410. Head position is defined as a vector comprising headX, headY, and headZ, each of the vector components being a distance. Head orientation is defined as a vector comprising head-heading, head-pitch, and head-roll, each of the vector components being an angle. In one aspect, a right hand coordinate system is assumed and headX is perpendicular to both headY 804 and headZ 806 as shown in FIG. 8. The parameters sphereX, sphereY, and sphereZ are in units of the virtual environment centered on some point or object of interest and the head tracking values are converted to the same units, although no necessarily linearly. The head tracking data 410 is also used to determine a new point of interest as described in the operation of receiving a fourth set of data inputs 312 (shown in FIG. 3).

Next, a rotation matrix based on the head tracking data 410 is constructed by multiplying three 4×4 matrices representing the heading, pitch, and roll of the user's head. For example:

Matrix $M_5=RPH$, where R, P, and H are transforms for head-roll, head-pitch, and head-heading, accordingly. Examples of the transform matrices R, P, and H are given as follows:

$$R = \begin{bmatrix} \text{Cos(head}-\text{roll)} & 0 & \text{Sin(head}-\text{roll)} & 0 \\ 0 & 1 & 0 & 0 \\ -\text{Sin(head}-\text{roll)} & 0 & \text{Cos(head}-\text{roll)} & 0 \\ 0 & 0 & 0 & 1 \end{bmatrix}$$

-continued $$P = \begin{bmatrix} 1 & 0 & 0 & 0 \\ 0 & \text{Cos(head - pitch)} & -\text{Sin(head - pitch)} & 0 \\ 0 & \text{Sin(head - pitch)} & \text{Cos(head - pitch)} & 0 \\ 0 & 0 & 0 & 1 \end{bmatrix}$$

$$H = \begin{bmatrix} \text{Cos(head - heading)} & -\text{Sin(head - heading)} & 0 & 0 \\ \text{Sin(head - heading)} & \text{Cos(head - heading)} & 0 & 0 \\ 0 & 0 & 1 & 0 \\ 0 & 0 & 0 & 1 \end{bmatrix}$$

Additionally, the viewpoint is rotated by head orientation parameters with a pre-multiplication of the original translation matrix and the constructed orientation matrix, as follows:

$$M_6 = M_1 M_5.$$

Next, the previously computed trackball position in matrix $M_4$ is restored into the orientation matrix $M_6$. For example:

$$M_{6(3,0)} = M_{4(3,0)}$$

$$M_{6(3,1)} = M_{4(3,1)}$$

$$M_{6(3,2)} = M_{4(3,2)}$$

Finally, a final hybrid viewpoint matrix 412, $M_6$ is applied to the display. The final hybrid viewpoint matrix 412 is the result of performing the act of changing the center of the reference sphere 314 (shown in FIG. 3).

FIGS. 9a-9d depict the virtual and real-world results of the final hybrid viewpoint matrix. In the physical world, the participant effectively pulls the virtual world around himself by manipulating the trackball parameters. For example, the participant can adjust the sphere pitch with a movement of the wrist. FIG. 9a illustrates the participant's viewpoint in the virtual world before the adjustment of the sphere pitch parameter, and FIG. 9b illustrates the participant's viewpoint in the virtual world after the adjustment of the sphere pitch parameter.

Although the virtual viewpoint of the participant has changed, FIGS. 9c and 9d illustrate that the participant's head in the real world has not moved, and the participant is still looking forward. FIG. 9c depicts the participant's real-world head position before the adjustment of the sphere pitch parameter, and FIG. 9d illustrates the participant's real-world head position after the adjustment of the sphere pitch parameter. The arrows depict that at all times the participant is able to turn his head naturally to view other objects in the virtual environment relative to a vector form the viewing position to the object of interest.

What is claimed is:

1. A system for navigating in a virtual environment and suitable for allowing a user to change a view orientation in the virtual environment independently of physical orientation of a user input, the system comprising a processor and a memory coupled with the processor, wherein the memory includes means that are executable by the processor for causing the processor to perform operations of:
   receiving data from a tracking subsystem having a first sensor set, a second sensor set, and a third sensor set, wherein the first sensor set and the second sensor set are different sensor sets, the first sensor set and the third sensor set are different sensor sets, and the second sensor set and the third sensor set are different sensor sets;
   locating a point of interest at a center of a reference sphere based on a first set of data inputs from the first sensor set;
   selecting a radius of the reference sphere;
   computing a position of an intermediate virtual-viewpoint on the reference sphere, wherein the radius of the reference sphere and the location of the intermediate virtual-viewpoint are based on a second set of data inputs from the second sensor set;
   determining a gaze direction from the intermediate virtual-viewpoint to the point of interest;
   defining a final virtual-viewpoint by adjusting the location and gaze direction of the intermediate virtual-viewpoint based on a third set of data inputs from the third sensor set, wherein the final virtual viewpoint allows a user to view the point of interest in the virtual environment from an orientation view correlated to the intermediate virtual viewpoint, while simultaneously allowing a head of the user to face comfortably forward in the physical world; and
   providing the final virtual viewpoint to a rendering engine to generate a virtual display to be displayed on a display device, whereby a user views, through the display device, the point of interest in a virtual environment from the final virtual viewpoint independently of physical orientation of a user input in the physical world.

2. A system for navigating in a virtual environment as set forth in claim 1, further comprising the operations of:
   computing a reference vector between the final virtual viewpoint and the point of interest;
   receiving a fourth set of data inputs from the third sensor set, wherein the fourth set of data inputs corresponds to new position of the head of the user and further correlates to a second point of interest; and
   performing immersive navigation by utilizing the fourth set of data inputs and the reference vector, wherein immersive navigation allows the user to view the second point of interest in the virtual environment relative to the reference vector from the final virtual viewpoint to the point of interest.

3. A system for navigating in a virtual environment as set forth in claim 2,
   wherein the first set of data inputs comprises an initial position of the user with respect to a three-dimensional coordinate system (headX, headY, and headZ), and wherein the operation of locating a point of interest comprises computing an initial viewpoint translation matrix;
   wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and
   wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

4. A system for navigating in a virtual environment as set forth in claim 3, wherein a sensor set is selected from a group consisting of a tracker, a keyboard, a computer mouse, a video camera, a gesture recognizer, and speech; and wherein the display is selected from a group consisting of a head mounted display, a plurality of video monitors, and a CAVE with supporting three-dimensional rendering software and hardware.

5. A system for navigating in a virtual environment as set forth in claim 4, wherein the sphere parameters correlate with wrist movements of the user, wherein the heading of the sphere correlates with the heading of the wrist, the pitch of the sphere correlates with the pitch of the wrist, and the radius of the sphere correlates with roll of the wrist and thumb of the user.

6. A system for navigating in a virtual environment as set forth in claim 5, wherein the initial viewpoint translation matrix is computed by $$M_1 = \begin{bmatrix} 1 & 0 & 0 & sphereX + headX \\ 0 & 1 & 0 & sphereY + headX \\ 0 & 0 & 1 & sphereZ + headZ \\ 0 & 0 & 0 & 1 \end{bmatrix}$$

where
  $M_1$ denotes the initial viewpoint translation matrix,
  headX, headY, and headZ denote the initial position of the head of the user with respect to a three-dimensional coordinate system, and
  sphereX, sphereY, and sphereZ denote sphere parameters in units of the virtual environment centered on the point of interest;
wherein the trackball matrix is computed by using pre-multiplication of 4×4 matrices as follows:

$$R_1 = \begin{bmatrix} \cos(sphere-heading) & -\sin(sphere-heading) & 0 & 0 \\ \sin(sphere-heading) & \cos(sphere-heading) & 0 & 0 \\ 0 & 0 & 1 & 0 \\ 0 & 0 & 0 & 1 \end{bmatrix}$$

$$M_2 = R_1 M_1$$

$$R_2 = \begin{bmatrix} 1 & 0 & 0 & 0 \\ 0 & \cos(sphere-pitch) & -\sin(sphere-pitch) & 0 \\ 0 & \sin(sphere-pitch) & \cos(sphere-pitch) & 0 \\ 0 & 0 & 0 & 1 \end{bmatrix}$$

$$M_3 = R_2 M_2$$

$$T = \begin{bmatrix} 1 & 0 & 0 & 0 \\ 0 & 1 & 0 & sphere-radius \\ 0 & 0 & 1 & 0 \\ 0 & 0 & 0 & 1 \end{bmatrix}$$

$$M_4 = T M_3$$

where
  $M_4$ denotes the trackball matrix,
  $R_1$ denotes a 4×4 rotational matrix that rotates matrix $M_1$ by sphere-heading about (0, 0, 1)
  $R_2$ denotes a 4×4 rotational matrix that rotates matrix $M_2$ by sphere-pitch about (1, 0, 0), and
  T denotes a 4×4 translational matrix that translates matrix $M_3$ by (0, sphere-radius, 0);
and wherein the final hybrid viewpoint matrix is computed by constructing a rotation matrix based on head orientation parameters as follows $$M_5 = RPH$$

$$R = \begin{bmatrix} \cos(head-roll) & 0 & \sin(head-roll) & 0 \\ 0 & 1 & 0 & 0 \\ -\sin(head-roll) & 0 & \cos(head-roll) & 0 \\ 0 & 0 & 0 & 1 \end{bmatrix}$$

$$P = \begin{bmatrix} 1 & 0 & 0 & 0 \\ 0 & \cos(head-pitch) & -\sin(head-pitch) & 0 \\ 0 & \sin(head-pitch) & \cos(head-pitch) & 0 \\ 0 & 0 & 0 & 1 \end{bmatrix}$$

$$H = \begin{bmatrix} \cos(head-heading) & -\sin(head-heading) & 0 & 0 \\ \sin(head-heading) & \cos(head-heading) & 0 & 0 \\ 0 & 0 & 1 & 0 \\ 0 & 0 & 0 & 1 \end{bmatrix}$$

where
  $M_5$ denotes the rotation matrix based on head orientation parameters,
  R denotes a 4×4 matrix transform for roll of the head of the user,
  P denotes a 4×4 matrix transform for pitch of the head of the user,
  H denotes a 4×4 matrix transform for heading of the head of the user,
next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $$M_6 = M_1 M_5$$

$$M_{6(3,0)} = M_{4(3,0)}$$

$$M_{6(3,1)} = M_{4(3,1)}$$

$$M_{6(3,2)} = M_{4(3,2)}$$

where
  $M_{4(3,0)}$ denotes the (3,0) coefficient of the trackball matrix $M_4$,
  $M_{4(3,1)}$ denotes the (3,1) coefficient of the trackball matrix $M_4$, and
  $M_{4(3,2)}$ denotes the (3,2) coefficient of the trackball matrix $M_4$.

7. A system for navigating in a virtual environment as set forth in claim 1, wherein reference sphere parameters correlate with wrist movements of a user, wherein heading of the sphere correlates with heading of the wrist, pitch of the sphere correlates with pitch of the wrist, and radius of the sphere correlates with roll of the wrist and thumb of the user.

8. A system for navigating in a virtual environment as set forth in claim 1,
  wherein the first set of data inputs comprises an initial position of the user with respect to a three-dimensional coordinate system (headX, headY, and headZ), and wherein the operation of locating a point of interest comprises computing an initial viewpoint translation matrix;
  wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

9. A system for navigating in a virtual environment as set forth in claim 8, wherein the initial viewpoint translation matrix is computed by $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where $M_1$ denotes the initial viewpoint translation matrix, headX, headY, and headZ denote the initial position of the head of the user with respect to a three-dimensional coordinate system, and sphereX, sphereY, and sphereZ denote sphere parameters in units of the virtual environment centered on the point of interest;

wherein the trackball matrix is computed by using pre-multiplication of 4×4 matrices as follows:

$$R_1 = \begin{bmatrix} \text{Cos(sphere - heading)} & -\text{Sin(sphere - heading)} & 0 & 0 \\ \text{Sin(sphere - heading)} & \text{Cos(sphere - heading)} & 0 & 0 \\ 0 & 0 & 1 & 0 \\ 0 & 0 & 0 & 1 \end{bmatrix}$$

$M_2 = R_1 M_1$ $$R_2 = \begin{bmatrix} 1 & 0 & 0 & 0 \\ 0 & \text{Cos(sphere - pitch)} & -\text{Sin(sphere - pitch)} & 0 \\ 0 & \text{Sin(sphere - pitch)} & \text{Cos(sphere - pitch)} & 0 \\ 0 & 0 & 0 & 1 \end{bmatrix}$$

$M_3 = R_2 M_2$ $$T = \begin{bmatrix} 1 & 0 & 0 & 0 \\ 0 & 1 & 0 & \text{sphere - radius} \\ 0 & 0 & 1 & 0 \\ 0 & 0 & 0 & 1 \end{bmatrix}$$

$M_4 = T M_3$ where $M_4$ denotes the trackball matrix, $R_1$ denotes a 4×4 rotational matrix that rotates matrix $M_1$ by sphere-heading about (0, 0, 1)

$R_2$ denotes a 4×4 rotational matrix that rotates matrix $M_2$ by sphere-pitch about (1, 0, 0), and T denotes a 4×4 translational matrix that translates matrix $M_3$ by (0, sphere-radius, 0);

and wherein the final hybrid viewpoint matrix is computed by constructing a rotation matrix based on head orientation parameters as follows $M_5 = RPH$ $$R = \begin{bmatrix} \text{Cos(head - roll)} & 0 & \text{Sin(head - roll)} & 0 \\ 0 & 1 & 0 & 0 \\ -\text{Sin(head - roll)} & 0 & \text{Cos(head - roll)} & 0 \\ 0 & 0 & 0 & 1 \end{bmatrix}$$

$$P = \begin{bmatrix} 1 & 0 & 0 & 0 \\ 0 & \text{Cos(head - pitch)} & -\text{Sin(head - pitch)} & 0 \\ 0 & \text{Sin(head - pitch)} & \text{Cos(head - pitch)} & 0 \\ 0 & 0 & 0 & 1 \end{bmatrix}$$

$$H = \begin{bmatrix} \text{Cos(head - heading)} & -\text{Sin(head - heading)} & 0 & 0 \\ \text{Sin(head - heading)} & \text{Cos(head - heading)} & 0 & 0 \\ 0 & 0 & 1 & 0 \\ 0 & 0 & 0 & 1 \end{bmatrix}$$

where $M_5$ denotes the rotation matrix based on head orientation parameters,

R denotes a 4×4 matrix transform for roll of the head of the user,

P denotes a 4×4 matrix transform for pitch of the head of the user,

H denotes a 4×4 matrix transform for heading of the head of the user, next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $M_6 = M_1 M_5$ $M_{6(3,0)} = M_{4(3,0)}$ $M_{6(3,1)} = M_{4(3,1)}$ $M_{6(3,2)} = M_{4(3,2)}$ where $M_{4(3,0)}$ denotes the (3,0) coefficient of the trackball matrix $M_4$, $M_{4(3,1)}$ denotes the (3,1) coefficient of the trackball matrix $M_4$, and $M_{4(3,2)}$ denotes the (3,2) coefficient of the trackball matrix $M_4$.

10. A computer implemented method for navigating in a virtual environment and suitable for allowing a user to change a view orientation in the virtual environment independently of physical orientation of a user input, the method comprising an act of causing a processor to perform operations of:

receiving data from a tracking subsystem having a first sensor set, a second sensor set, and a third sensor set, wherein the first sensor set and the second sensor set are different sensor sets, the first sensor set and the third sensor set are different sensor sets, and the second sensor set and the third sensor set are different sensor sets;

locating a point of interest at a center of a reference sphere based on a first set of data inputs from the first sensor set;

selecting a radius of the reference sphere;

computing a position of an intermediate virtual-viewpoint on the reference sphere, wherein the radius of the reference sphere and the location of the intermediate virtual-viewpoint are based on a second set of data inputs from the second sensor set;

determining a gaze direction from the intermediate virtual-viewpoint to the point of interest;

defining a final virtual-viewpoint by adjusting the location and gaze direction of the intermediate virtual-viewpoint based on a third set of data inputs from the third sensor set, wherein the final virtual viewpoint allows a user to view the point of interest in the virtual environment from an orientation view correlated to the intermediate virtual viewpoint, while simultaneously allowing a head of the user to face comfortably forward in the physical world; and providing the final virtual viewpoint to a rendering engine to generate a virtual display to be displayed on a display device, whereby a user views, through the display device, the point of interest in a virtual environment from the final virtual viewpoint independently of physical orientation of a user input in the physical world.

11. A computer implemented method for navigating in a virtual environment as set forth in claim 10, further comprising the operations of:

computing a reference vector between the final virtual viewpoint and the point of interest;

receiving a fourth set of data inputs from the third sensor set, wherein the fourth set of data inputs corresponds to new position of the head of the user and further correlates to a second point of interest; and performing immersive navigation by utilizing the fourth set of data inputs and the reference vector, wherein immersive navigation allows the user to view the second point of interest in the virtual environment relative to the reference vector from the final virtual viewpoint to the point of interest.

12. A computer implemented method for navigating in a virtual environment as set forth in claim 11, wherein the first set of data inputs comprises an initial position of the user with respect to a three-dimensional coordinate system (headX, headY, and headZ), and wherein the operation of locating a point of interest comprises computing an initial viewpoint translation matrix;

wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

13. A computer implemented method for navigating in a virtual environment as set forth in claim 12, wherein a sensor set is selected from a group consisting of a tracker, a keyboard, a computer mouse, a video camera, a gesture recognizer, and speech; and wherein the display is selected from a group consisting of a head mounted display, a plurality of video monitors, and a CAVE with supporting three-dimensional rendering software and hardware.

14. A computer implemented method for navigating in a virtual environment as set forth in claim 13, wherein the sphere parameters correlate with wrist movements of the user, wherein the heading of the sphere correlates with the heading of the wrist, the pitch of the sphere correlates with the pitch of the wrist, and the radius of the sphere correlates with roll of the wrist and thumb of the user.

15. A computer implemented method for navigating in a virtual environment as set forth in claim 14, wherein the initial viewpoint translation matrix is computed by $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where $M_1$ denotes the initial viewpoint translation matrix, headX, headY, and headZ denote the initial position of the head of the user with respect to a three-dimensional coordinate system, and sphereX, sphereY, and sphereZ denote sphere parameters in units of the virtual environment centered on the point of interest;

wherein the trackball matrix is computed by using pre-multiplication of 4×4 matrices as follows:

$$R_1 = \begin{bmatrix} \text{Cos(sphere} - \text{heading)} & -\text{Sin(sphere} - \text{heading)} & 0 & 0 \\ \text{Sin(sphere} - \text{heading)} & \text{Cos(sphere} - \text{heading)} & 0 & 0 \\ 0 & 0 & 1 & 0 \\ 0 & 0 & 0 & 1 \end{bmatrix}$$

$M_2 = R_1 M_1$ $$R_2 = \begin{bmatrix} 1 & 0 & 0 & 0 \\ 0 & \text{Cos(sphere} - \text{pitch)} & -\text{Sin(sphere} - \text{pitch)} & 0 \\ 0 & \text{Sin(sphere} - \text{pitch)} & \text{Cos(sphere} - \text{pitch)} & 0 \\ 0 & 0 & 0 & 1 \end{bmatrix}$$

$M_3 = R_2 M_2$ $$T = \begin{bmatrix} 1 & 0 & 0 & 0 \\ 0 & 1 & 0 & \text{sphere} - \text{radius} \\ 0 & 0 & 1 & 0 \\ 0 & 0 & 0 & 1 \end{bmatrix}$$

$M_4 = T M_3$ where $M_4$ denotes the trackball matrix, $R_1$ denotes a 4×4 rotational matrix that rotates matrix $M_1$ by sphere-heading about (0, 0, 1)

$R_2$ denotes a 4×4 rotational matrix that rotates matrix $M_2$ by sphere-pitch about (1, 0, 0), and T denotes a 4×4 translational matrix that translates matrix $M_3$ by (0, sphere-radius, 0);

and wherein the final hybrid viewpoint matrix is computed by constructing a rotation matrix based on head orientation parameters as follows $M_5 = RPH$ $$R = \begin{bmatrix} \text{Cos(head-roll)} & 0 & \text{Sin(head-roll)} & 0 \\ 0 & 1 & 0 & 0 \\ -\text{Sin(head-roll)} & 0 & \text{Cos(head-roll)} & 0 \\ 0 & 0 & 0 & 1 \end{bmatrix}$$

$$P = \begin{bmatrix} 1 & 0 & 0 & 0 \\ 0 & \text{Cos(head-pitch)} & -\text{Sin(head-pitch)} & 0 \\ 0 & \text{Sin(head-pitch)} & \text{Cos(head-pitch)} & 0 \\ 0 & 0 & 0 & 1 \end{bmatrix}$$

$$H = \begin{bmatrix} \text{Cos(head-heading)} & -\text{Sin(head-heading)} & 0 & 0 \\ \text{Sin(head-heading)} & \text{Cos(head-heading)} & 0 & 0 \\ 0 & 0 & 1 & 0 \\ 0 & 0 & 0 & 1 \end{bmatrix}$$

where
  $M_5$ denotes the rotation matrix based on head orientation parameters,
  R denotes a 4×4 matrix transform for roll of the head of the user,
  P denotes a 4×4 matrix transform for pitch of the head of the user,
  H denotes a 4×4 matrix transform for heading of the head of the user,
next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $M_6 = M_1 M_5$ $M_{6(3,0)} = M_{4(3,0)}$ $M_{6(3,1)} = M_{4(3,1)}$ $M_{6(3,2)} = M_{4(3,2)}$ where
  $M_{4(3,0)}$ denotes the (3,0) coefficient of the trackball matrix $M_4$,
  $M_{4(3,1)}$ denotes the (3,1) coefficient of the trackball matrix $M_4$, and
  $M_{4(3,2)}$ denotes the (3,2) coefficient of the trackball matrix $M_4$.

16. A computer implemented method for navigating in a virtual environment as set forth in claim 10, wherein reference sphere parameters correlate with wrist movements of a user, wherein heading of the sphere correlates with heading of the wrist, pitch of the sphere correlates with pitch of the wrist, and radius of the sphere correlates with roll of the wrist and thumb of the user.

17. A computer implemented method for navigating in a virtual environment as set forth in claim 10,
  wherein the first set of data inputs comprises an initial position of the user with respect to a three-dimensional coordinate system (headX, heady, and headZ), and wherein the operation of locating a point of interest comprises computing an initial viewpoint translation matrix;
  wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and
  wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

18. A computer implemented method for navigating in a virtual environment as set forth in claim 17, wherein the initial viewpoint translation matrix is computed by $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where
  $M_1$ denotes the initial viewpoint translation matrix,
  headX, headY, and headZ denote the initial position of the head of the user with respect to a three-dimensional coordinate system, and
  sphereX, sphereY, and sphereZ denote sphere parameters in units of the virtual environment centered on the point of interest;
wherein the trackball matrix is computed by using pre-multiplication of 4×4 matrices as follows:

$$R_1 = \begin{bmatrix} \text{Cos(sphere-heading)} & -\text{Sin(sphere-heading)} & 0 & 0 \\ \text{Sin(sphere-heading)} & \text{Cos(sphere-heading)} & 0 & 0 \\ 0 & 0 & 1 & 0 \\ 0 & 0 & 0 & 1 \end{bmatrix}$$

$M_2 = R_1 M_1$ $$R_2 = \begin{bmatrix} 1 & 0 & 0 & 0 \\ 0 & \text{Cos(sphere-pitch)} & -\text{Sin(sphere-pitch)} & 0 \\ 0 & \text{Sin(sphere-pitch)} & \text{Cos(sphere-pitch)} & 0 \\ 0 & 0 & 0 & 1 \end{bmatrix}$$

$M_3 = R_2 M_2$ $$T = \begin{bmatrix} 1 & 0 & 0 & 0 \\ 0 & 1 & 0 & sphere-radius \\ 0 & 0 & 1 & 0 \\ 0 & 0 & 0 & 1 \end{bmatrix}$$

$M_4 = T M_3$ where
  $M_4$ denotes the trackball matrix,
  $R_1$ denotes a 4×4 rotational matrix that rotates matrix $M_1$ by sphere-heading about (0, 0, 1)
  $R_2$ denotes a 4×4 rotational matrix that rotates matrix $M_2$ by sphere-pitch about (1, 0, 0), and T denotes a 4×4 translational matrix that translates matrix $M_3$ by (0, sphere-radius, 0);

and wherein the final hybrid viewpoint matrix is computed by constructing a rotation matrix based on head orientation parameters as follows $$M_5 = RPH$$

$$R = \begin{bmatrix} \cos(\text{head}-\text{roll}) & 0 & \sin(\text{head}-\text{roll}) & 0 \\ 0 & 1 & 0 & 0 \\ -\sin(\text{head}-\text{roll}) & 0 & \cos(\text{head}-\text{roll}) & 0 \\ 0 & 0 & 0 & 1 \end{bmatrix}$$

$$P = \begin{bmatrix} 1 & 0 & 0 & 0 \\ 0 & \cos(\text{head}-\text{pitch}) & -\sin(\text{head}-\text{pitch}) & 0 \\ 0 & \sin(\text{head}-\text{pitch}) & \cos(\text{head}-\text{pitch}) & 0 \\ 0 & 0 & 0 & 1 \end{bmatrix}$$

$$H = \begin{bmatrix} \cos(\text{head}-\text{heading}) & -\sin(\text{head}-\text{heading}) & 0 & 0 \\ \sin(\text{head}-\text{heading}) & \cos(\text{head}-\text{heading}) & 0 & 0 \\ 0 & 0 & 1 & 0 \\ 0 & 0 & 0 & 1 \end{bmatrix}$$

where
  $M_5$ denotes the rotation matrix based on head orientation parameters,
  R denotes a 4×4 matrix transform for roll of the head of the user,
  P denotes a 4×4 matrix transform for pitch of the head of the user,
  H denotes a 4×4 matrix transform for heading of the head of the user,
next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $$M_6 = M_1 M_5$$

$$M_{6(3,0)} = M_{4(3,0)}$$

$$M_{6(3,1)} = M_{4(3,1)}$$

$$M_{6(3,2)} = M_{4(3,2)}$$

where
  $M_{4(3,0)}$ denotes the (3,0) coefficient of the trackball matrix $M_4$,
  $M_{4(3,1)}$ denotes the (3,1) coefficient of the trackball matrix $M_4$, and
  $M_{4(3,2)}$ denotes the (3,2) coefficient of the trackball matrix $M_4$.

19. A computer program product for navigating in a virtual environment and suitable for allowing a user to change a view orientation in the virtual environment independently of physical orientation of a user input, the computer program product comprising computer-readable means stored on a computer readable medium that are executable by a computer having a processor for causing the processor to perform the operations of:
  receiving data from a tracking subsystem having a first sensor set, a second sensor set, and a third sensor set, wherein the first sensor set and the second sensor set are different sensor sets, the first sensor set and the third sensor set are different sensor sets, and the second sensor set and the third sensor set are different sensor sets;
  locating a point of interest at a center of a reference sphere based on a first set of data inputs from the first sensor set;
  selecting a radius of the reference sphere;
  computing a position of an intermediate virtual-viewpoint on the reference sphere, wherein the radius of the reference sphere and the location of the intermediate virtual-viewpoint are based on a second set of data inputs from the second sensor set;
  determining a gaze direction from the intermediate virtual-viewpoint to the point of interest;
  defining a final virtual-viewpoint by adjusting the location and gaze direction of the intermediate virtual-viewpoint based on a third set of data inputs from the third sensor set, wherein the final virtual viewpoint allows a user to view the point of interest in the virtual environment from an orientation view correlated to the intermediate virtual viewpoint, while simultaneously allowing a head of the user to face comfortably forward in the physical world; and
  providing the final virtual viewpoint to a rendering engine to generate a virtual display to be displayed on a display device, whereby a user views, through the display device, the point of interest in a virtual environment from the final virtual viewpoint independently of physical orientation of a user input in the physical world.

20. A computer program product for navigating in a virtual environment as set forth in claim 19, further comprising the operations of:
  computing a reference vector between the final virtual viewpoint and the point of interest;
  receiving a fourth set of data inputs from the third sensor set, wherein the fourth set of data inputs corresponds to new position of the head of the user and further correlates to a second point of interest; and
  performing immersive navigation by utilizing the fourth set of data inputs and the reference vector, wherein immersive navigation allows the user to view the second point of interest in the virtual environment relative to the reference vector from the final virtual viewpoint to the point of interest.

21. A computer program product for navigating in a virtual environment as set forth in claim 20,
  wherein the first set of data inputs comprises an initial position of the user with respect to a three-dimensional coordinate system (headX, headY, and headZ), and wherein the operation of locating a point of interest comprises computing an initial viewpoint translation matrix;
  wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and
  wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

22. A computer program product for navigating in a virtual environment as set forth in claim 21, wherein a sensor set is selected from a group consisting of a tracker, a keyboard, a computer mouse, a video camera, a gesture recognizer, and speech; and wherein the display is selected from a group consisting of a head mounted display, a plurality of video monitors, and a CAVE with supporting three-dimensional rendering software and hardware.

23. A computer program product for navigating in a virtual environment as set forth in claim 22, wherein the sphere parameters correlate with wrist movements of the user, wherein the heading of the sphere correlates with the heading of the wrist, the pitch of the sphere correlates with the pitch of the wrist, and the radius of the sphere correlates with roll of the wrist and thumb of the user.

24. A computer program product for navigating in a virtual environment as set forth in claim 23, wherein the initial viewpoint translation matrix is computed by $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where
- $M_1$ denotes the initial viewpoint translation matrix,
- headX, headY, and headZ denote the initial position of the head of the user with respect to a three-dimensional coordinate system, and
- sphereX, sphereY, and sphereZ denote sphere parameters in units of the virtual environment centered on the point of interest;

wherein the trackball matrix is computed by using pre-multiplication of 4×4 matrices as follows:

$$R_1 = \begin{bmatrix} \text{Cos(sphere - heading)} & -\text{Sin(sphere - heading)} & 0 & 0 \\ \text{Sin(sphere - heading)} & \text{Cos(sphere - heading)} & 0 & 0 \\ 0 & 0 & 1 & 0 \\ 0 & 0 & 0 & 1 \end{bmatrix}$$

$$M_2 = R_1 M_1$$

$$R_2 = \begin{bmatrix} 1 & 0 & 0 & 0 \\ 0 & \text{Cos(sphere - pitch)} & -\text{Sin(sphere - pitch)} & 0 \\ 0 & \text{Sin(sphere - pitch)} & \text{Cos(sphere - pitch)} & 0 \\ 0 & 0 & 0 & 1 \end{bmatrix}$$

$$M_3 = R_2 M_2$$

$$T = \begin{bmatrix} 1 & 0 & 0 & 0 \\ 0 & 1 & 0 & sphere - radius \\ 0 & 0 & 1 & 0 \\ 0 & 0 & 0 & 1 \end{bmatrix}$$

$$M_4 = T M_3$$

where
- $M_4$ denotes the trackball matrix,
- $R_1$ denotes a 4×4 rotational matrix that rotates matrix $M_1$ by sphere-heading about (0, 0, 1),
- $R_2$ denotes a 4×4 rotational matrix that rotates matrix $M_2$ by sphere-pitch about (1, 0, 0), and T denotes a 4×4 translational matrix that translates matrix $M_3$ by (0, sphere-radius, 0);

and wherein the final hybrid viewpoint matrix is computed by constructing a rotation matrix based on head orientation parameters as follows $$M_5 = RPH$$

$$R = \begin{bmatrix} \text{Cos(head - roll)} & 0 & \text{Sin(head - roll)} & 0 \\ 0 & 1 & 0 & 0 \\ -\text{Sin(head - roll)} & 0 & \text{Cos(head - roll)} & 0 \\ 0 & 0 & 0 & 1 \end{bmatrix}$$

$$P = \begin{bmatrix} 1 & 0 & 0 & 0 \\ 0 & \text{Cos(head - pitch)} & -\text{Sin(head - pitch)} & 0 \\ 0 & \text{Sin(head - pitch)} & \text{Cos(head - pitch)} & 0 \\ 0 & 0 & 0 & 1 \end{bmatrix}$$

$$H = \begin{bmatrix} \text{Cos(head - heading)} & -\text{Sin(head - heading)} & 0 & 0 \\ \text{Sin(head - heading)} & \text{Cos(head - heading)} & 0 & 0 \\ 0 & 0 & 1 & 0 \\ 0 & 0 & 0 & 1 \end{bmatrix}$$

where
- $M_5$ denotes the rotation matrix based on head orientation parameters,
- R denotes a 4×4 matrix transform for roll of the head of the user,
- P denotes a 4×4 matrix transform for pitch of the head of the user,
- H denotes a 4×4 matrix transform for heading of the head of the user, next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $$M_6 = M_1 M_5$$

$$M_{6(3,0)} = M_{4(3,0)}$$

$$M_{6(3,1)} = M_{4(3,1)}$$

$$M_{6(3,2)} = M_{4(3,2)}$$

where
- $M_{4(3,0)}$ denotes the (3,0) coefficient of the trackball matrix $M_4$,
- $M_{4(3,1)}$ denotes the (3,1) coefficient of the trackball matrix $M_4$, and
- $M_{4(3,2)}$ denotes the (3,2) coefficient of the trackball matrix $M_4$.

25. A computer program product for navigating in a virtual environment as set forth in claim 19, wherein reference sphere parameters correlate with wrist movements of a user, wherein heading of the sphere correlates with heading of the wrist, pitch of the sphere correlates with pitch of the wrist, and radius of the sphere correlates with roll of the wrist and thumb of the user.

26. A computer program product for navigating in a virtual environment as set forth in claim 19,
   wherein the first set of data inputs comprises an initial position of the user with respect to a three-dimensional coordinate system (headX, headY, and headZ), and
   wherein the operation of locating a point of interest comprises computing an initial viewpoint translation matrix;

wherein the second set of data inputs comprises radius of reference sphere, pitch of reference sphere, and heading of reference sphere, and wherein the operation of computing a position of an intermediate virtual-viewpoint comprises computing a trackball matrix to rotate and position intermediate virtual-viewpoint based on sphere parameters; and wherein the third set of data inputs comprises pitch of the head of the user, heading of the head of the user, roll of the head of the user, and three-dimensional position of the head of the user within a three-dimensional coordinate system (headX, headY, headZ), and wherein the operation of defining a final virtual viewpoint comprises computing a final hybrid viewpoint matrix.

27. A computer program product for navigating in a virtual environment as set forth in claim 26, wherein the initial viewpoint translation matrix is computed by $$M_1 = \begin{bmatrix} 1 & 0 & 0 & sphereX + headX \\ 0 & 1 & 0 & sphereY + headY \\ 0 & 0 & 1 & sphereZ + headZ \\ 0 & 0 & 0 & 1 \end{bmatrix}$$

where
$M_1$ denotes the initial viewpoint translation matrix,
headX, headY, and headZ denote the initial position of the head of the user with respect to a three-dimensional coordinate system, and
sphereX, sphereY, and sphereZ denote sphere parameters in units of the virtual environment centered on the point of interest;

wherein the trackball matrix is computed by using pre-multiplication of 4×4 matrices as follows:

$$R_1 = \begin{bmatrix} Cos(sphere-heading) & -Sin(sphere-heading) & 0 & 0 \\ Sin(sphere-heading) & Cos(sphere-heading) & 0 & 0 \\ 0 & 0 & 1 & 0 \\ 0 & 0 & 0 & 1 \end{bmatrix}$$

$M_2 = R_1 M_1$ $$R_2 = \begin{bmatrix} 1 & 0 & 0 & 0 \\ 0 & Cos(sphere-pitch) & -Sin(sphere-pitch) & 0 \\ 0 & Sin(sphere-pitch) & Cos(sphere-pitch) & 0 \\ 0 & 0 & 0 & 1 \end{bmatrix}$$

$M_3 = R_2 M_2$ $$T = \begin{bmatrix} 1 & 0 & 0 & 0 \\ 0 & 1 & 0 & sphere-radius \\ 0 & 0 & 1 & 0 \\ 0 & 0 & 0 & 1 \end{bmatrix}$$

$M_4 = TM_3$ where
$M_4$ denotes the trackball matrix,
$R_1$ denotes a 4×4 rotational matrix that rotates matrix $M_1$ by sphere-heading about (0, 0, 1)
$R_2$ denotes a 4×4 rotational matrix that rotates matrix $M_2$ by sphere-pitch about (1, 0, 0), and
T denotes a 4×4 translational matrix that translates matrix $M_3$ by (0, sphere-radius, 0);

and wherein the final hybrid viewpoint matrix is computed by constructing a rotation matrix based on head orientation parameters as follows $M_5 = RPH$ $$R = \begin{bmatrix} Cos(head-roll) & 0 & Sin(head-roll) & 0 \\ 0 & 1 & 0 & 0 \\ -Sin(head-roll) & 0 & Cos(head-roll) & 0 \\ 0 & 0 & 0 & 1 \end{bmatrix}$$

$$P = \begin{bmatrix} 1 & 0 & 0 & 0 \\ 0 & Cos(head-pitch) & -Sin(head-pitch) & 0 \\ 0 & Sin(head-pitch) & Cos(head-pitch) & 0 \\ 0 & 0 & 0 & 1 \end{bmatrix}$$

$$H = \begin{bmatrix} Cos(head-heading) & -Sin(head-heading) & 0 & 0 \\ Sin(head-heading) & Cos(head-heading) & 0 & 0 \\ 0 & 0 & 1 & 0 \\ 0 & 0 & 0 & 1 \end{bmatrix}$$

where
$M_5$ denotes the rotation matrix based on head orientation parameters,
R denotes a 4×4 matrix transform for roll of the head of the user,
P denotes a 4×4 matrix transform for pitch of the head of the user,
H denotes a 4×4 matrix transform for heading of the head of the user, next the final hybrid viewpoint matrix, $M_6$, is constructed by rotating and positioning the initial view point translation matrix by head orientation parameters and then restoring computed trackball matrix position parameters into the hybrid viewpoint matrix, $M_6$, as follows $M_6 = M_1 M_5$ $M_{6(3,0)} = M_{4(3,0)}$ $M_{6(3,1)} = M_{4(3,1)}$ $M_{6(3,2)} = M_{4(3,2)}$ where
$M_{4(3,0)}$ denotes the (3,0) coefficient of the trackball matrix $M_4$,
$M_{4(3,1)}$ denotes the (3,1) coefficient of the trackball matrix $M_4$, and
$M_{4(3,2)}$ denotes the (3,2) coefficient of the trackball matrix $M_4$.

* * * * *